(12) United States Patent
White et al.

(10) Patent No.: US 11,695,198 B1
(45) Date of Patent: Jul. 4, 2023

(54) DISTRIBUTED SEMI-AUTONOMOUS PHASED ARRAYS FOR SUBSURFACE VLF TRANSMISSION

(71) Applicant: HRL Laboratories, LLC, Malibu, CA (US)

(72) Inventors: Carson R. White, Agoura Hills, CA (US); Walter S. Wall, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/864,322

(22) Filed: Jul. 13, 2022

Related U.S. Application Data

(62) Division of application No. 16/868,443, filed on May 6, 2020, now Pat. No. 11,522,276.

(60) Provisional application No. 62/871,900, filed on Jul. 9, 2019.

(51) Int. Cl.
*H01Q 1/28* (2006.01)
*H04B 7/15* (2006.01)
*H01Q 1/30* (2006.01)
*H04B 7/185* (2006.01)

(52) U.S. Cl.
CPC ........... *H01Q 1/30* (2013.01); *H04B 7/18504* (2013.01)

(58) Field of Classification Search
CPC ...... H04B 7/15; H04B 7/185; H04B 7/18502; H04B 7/18504; H01Q 1/22; H01Q 1/27; H01Q 1/28; H01Q 1/30
See application file for complete search history.

(56) References Cited

U.S. PATENT DOCUMENTS

| 4,335,469 A | 6/1982 | Tharp et al. |
| 4,476,576 A | 10/1984 | Wheeler et al. |
| 4,903,036 A | 2/1990 | Wheeler |
| 5,038,406 A * | 8/1991 | Titterton ................ H04B 10/11 398/107 |
| 6,058,071 A | 5/2000 | Woodall |
| 8,059,485 B2 * | 11/2011 | Sato ........................ B63G 8/39 367/134 |
| 8,418,642 B2 * | 4/2013 | Vosburgh .............. F42B 12/365 114/328 |
| 8,760,355 B1 | 6/2014 | Tonn |

(Continued)

FOREIGN PATENT DOCUMENTS

| CN | 106506015 A | 3/2017 |
| GB | 2457581 A | 8/2009 |

(Continued)

OTHER PUBLICATIONS

King, R., et al., "The synthesis of surface reactance using an artificial dielectric", IEEE Transactions on Antennas and Propagation, vol. 31, No. 3, May 1983, pp. 471-476 (considered by Examiner in parent U.S. Appl. No. 16/868,443).

(Continued)

*Primary Examiner* — Blane J Jackson
(74) *Attorney, Agent, or Firm* — Ladas & Parry, LLP

(57) ABSTRACT

A system for subsurface transmission includes an array of very low frequency (VLF) transmitter nodes supported by semi-autonomous maritime, airborne, or space platforms spaced at regular intervals from their nearest neighbors and phased to localize VLF coverage to some desired area on a body of water.

14 Claims, 10 Drawing Sheets

(56) References Cited

U.S. PATENT DOCUMENTS

| | | | | |
|---|---|---|---|---|
| 9,213,077 | B2* | 12/2015 | Kieffer | B63B 22/00 |
| 9,277,476 | B2* | 3/2016 | Yoo | H04W 40/02 |
| 10,992,020 | B1* | 4/2021 | Singleton | H01Q 1/38 |
| 11,522,276 | B1* | 12/2022 | White | H01Q 1/30 |
| 2008/0143621 | A1 | 6/2008 | Diaz | |
| 2015/0092824 | A1 | 4/2015 | Wicker | |
| 2017/0194703 | A1 | 7/2017 | Watson | |
| 2022/0140903 | A1* | 5/2022 | Ooi | H04B 10/1129 398/209 |

FOREIGN PATENT DOCUMENTS

| | | |
|---|---|---|
| RU | 2666904 C1 | 9/2018 |
| RU | 2019116043 A | 11/2020 |

OTHER PUBLICATIONS

Linvill, J.G., "Transistor Negative-Impedance Converters," in Proceedings of the IRE, vol. 41, No. 6, pp. 725-729, Jun. 1953 (considered by Examiner in parent U.S. Appl. No. 16/868,443).

Silveirinha, M., "Electromagnetic characterization of textured surfaces formed by metallic pins", IEEE Transactions on Antennas and Propagation, vol. 56, No. 2, Feb. 2008, pp. 405-415 (considered by Examiner in parent U.S. Appl. No. 16/868,443).

U.S. Appl. No. 16/870,784, filed May 8, 2020, considered by Examiner in parent U.S. Appl. No. 16/868,443.

U.S. Appl. No. 16/870,784, filed Wall.

U.S. Appl. No. 16/868,443, filed White.

From U.S. Appl. No. 16/868,443 (unpublished, non-publication requested) filed May 6, 2020, Inventor: Carson R. White.

From U.S. Appl. No. 16/868,443 (unpublished, non-publication requested), Notice of Allowance dated Aug. 5, 2022.

From U.S. Appl. No. 16/868,443 (unpublished, non-publication requested), Office Action dated May 25, 2022.

From U.S. Appl. No. 16/868,443 (unpublished, non-publication requested), Office Action dated Feb. 14, 2022.

From U.S. Appl. No. 16/870,784 (unpublished, non-publication requested), Notice of Allowance dated May 31, 2022.

From U.S. Appl. No. 16/870,784 (unpublished, non-publication requested), Office Action dated Feb. 4, 2022.

* cited by examiner

DISTRIBUTED SEMI-AUTONOMOUS PHASED ARRAYS FOR SUBSURFACE VLF TRANSMISSION

CROSS REFERENCE TO RELATED APPLICATIONS

This application relates to and is a divisional application of U.S. patent application Ser. No. 16/868,443 filed on May 6, 2020, which relates to, claims the benefit of, and claims priority to U.S. Provisional Patent Application 62/871,900, filed on Jul. 9, 2019, which are incorporated herein by reference as though set forth in full. This application is related to U.S. Provisional Patent Application Ser. No. 62/872,045 filed on Jul. 9, 2019 and entitled "An Array of VLF Scatterers for Control of Electromagnetic Wave Propagation on the Ocean Surface" the disclosure of which is hereby incorporated herein by reference.

STATEMENT REGARDING FEDERAL FUNDING

This invention was made under U.S. Government Contract N66001-19-C-4018. The U.S. Government may have certain rights in this invention.

TECHNICAL FIELD

This disclosure relates to very low frequency (VLF) transmitters and antennas.

BACKGROUND

Very low frequency or VLF is the International Telecommunications Union (ITU) designation for radio frequencies (RF) in the range of about 3 to 30 kilohertz (kHz), corresponding to wavelengths from about 100 to 10 kilometers, respectively. The VLF band is used for a few radio navigation services, government time radio stations (broadcasting time signals to set radio clocks) and for secure military communication. Since VLF waves can penetrate a useful distance into saltwater, they are used for military communication with underwater platforms. Herein, VLF may refer to radio frequencies (RF) in the range of 3 to 30 kilohertz (kHz), or other very low frequencies.

Prior art very low frequency (VLF) transmitters have been used for command and control of submerged platforms, and are typically large stationary monolithic structures. These prior art VLF transmitters are massive in size and require a large land area, and in addition have high operational costs.

A variety of other VLF transmitter architectures have been proposed and investigated. The most common type of VLF transmitter is a large ground based station, such as the Cutler station in Maine. Typically these VLF transmitters are constructed of one or more very large top-loaded monopole structures designed to couple energy into the earth-ionosphere waveguide (EIW) to provide VLF coverage over large sections of the earth.

Another prior art VLF transmitter architecture utilizes a long wire antenna trailing behind an airplane to achieve VLF transmission from a single mobile platform. Such an architecture is described in U.S. Pat. No. 4,335,469, issued Jun. 15, 1982, which is incorporated herein by reference.

Yet another prior art VLF transmitter architecture employs aerostats and consists of a ground based VLF source feeding a long conductor, which is supported by a lighter than air structure, such as an aerostat or a balloon. For example, U.S. Pat. No. 4,476,576, issued Oct. 9, 1984, and U.S. Pat. No. 4,903,036, issued Feb. 20, 1990, each describe prior art VLF communication systems, which utilize a cable connected to a deployed aerostat, which acts a tether and a VLF antenna. The cable is connected to an RF transmitter located on the ground. In U.S. Pat. No. 4,903,036, issued Feb. 20, 1990, the tether is set to have a length that is roughly one quarter of the desired electromagnetic wavelength.

Another prior art VLF transmitter architecture strings a long conductor between two satellites to enable VLF/ELF (very low frequency/extremely low frequency) transmission from orbit, such as the NASA tethered satellite system (TSS).

While all of these prior systems are effective at generating VLF radiation, they each have relied on massive physical size to achieve efficient operation. These systems also do not provide a method of controlling VLF signal coverage.

Other techniques have also been proposed in the literature for VLF generation such as high frequency (HF) heating of the ionosphere but are dependent on conditions in the ionosphere, require massive HF transmitters, and provide limited ability to manage VLF coverage.

What is needed is an improved VLF transmitter antenna system and a method of phasing and coordinating arrays of maritime, airborne or space-borne VLF transmitters to create a localized region of VLF coverage at and below the surface of a body of water. Also needed is a way of controlling the coverage of a transmitted VLF signal. The embodiments of the present disclosure answer these and other needs.

SUMMARY

In an embodiment disclosed herein, a system for subsurface transmission comprises an array of very low frequency (VLF) transmitter nodes hosted on maritime platforms arranged in an array on a body of water, each VLF transmitter node comprising: a controller; a VLF transmitter coupled to the controller; a data buffer coupled to the controller; a navigation subsystem coupled to the controller; and a communications transceiver coupled to the controller; wherein each VLF transmitter node is positioned less than one half wavelength of a desired very low frequency from another VLF transmitter node; wherein the array of VLF transmitter nodes has a center location; wherein data to be transmitted is received by the communications transceiver in each VLF transmitter node and stored in the data buffer in each VLF transmitter node; and wherein each respective VLF transmitter node transmits the data in the data buffer with phasing or timing based on position data from the navigation sensor in the respective VLF transmitter node and the position data relative to the center location.

In another embodiment disclosed herein, a system for subsurface transmission comprises an array of very low frequency (VLF) transmitter nodes each hosted on an airborne platform and arranged in a line or plane normal to a surface of a body of water, each VLF transmitter node comprising: a controller; a VLF transmitter coupled to the controller; a data buffer coupled to the controller; a navigation subsystem coupled to the controller; and a communications transceiver coupled to the controller; wherein each VLF transmitter node is positioned less than one half wavelength of a desired very low frequency from another VLF transmitter node; wherein data to be transmitted is received by the communications transceiver in each VLF transmitter node and stored in the data buffer in each VLF transmitter node; and wherein each respective VLF transmitter node transmits the data in the data buffer of the respective VLF transmitter node with phasing or timing to enhance radiation in a direction towards the body of water and to suppress radiation in other directions.

In yet another embodiment disclosed herein, a system for subsurface transmission comprises a first array of very low frequency (VLF) transmitter nodes each hosted on an airborne platform and arranged substantially parallel to a surface of a body of water, each VLF transmitter node comprising: a controller; a VLF transmitter coupled to the controller; a data buffer coupled to the controller; a navigation subsystem coupled to the controller; and a communications transceiver coupled to the controller; wherein each VLF transmitter node is positioned less than one wavelength of a desired very low frequency from another VLF transmitter node; wherein data to be transmitted is received by the communications transceiver in each VLF transmitter node and stored in the data buffer in each VLF transmitter node; and wherein each respective VLF transmitter node transmits the data in the data buffer of the respective VLF transmitter node with phasing or timing to enhance radiation in a direction towards the body of water and to suppress radiation in other directions.

In still another embodiment disclosed herein, a system for subsurface transmission comprises an array of satellite nodes arranged in a plane substantially parallel to a surface of a body of water, each satellite node comprising: a pair of satellites, each pair of satellites comprising: a tether between the pair of satellites; a dipole antenna placed along the tether and oriented parallel to the body of water; a controller; a VLF transmitter coupled to the dipole antenna and to the controller; a data buffer coupled to the controller; a navigation subsystem coupled to the controller; and a communications transceiver coupled to the controller; wherein each satellite node is positioned less than one wavelength of a desired very low frequency from another satellite node; wherein data to be transmitted is received by the communications transceiver in each satellite node and stored in the data buffer in each satellite node; wherein each respective satellite node transmits the data in the data buffer of the respective node with phasing or timing to enhance radiation in a direction towards the body of water and to suppress radiation in other directions; and wherein all the satellite nodes begin transmission of data in the data buffer at substantially the same time with substantially the same phase.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Conventional VLF transmitters used for command and control of submerged platforms are typically large monolithic structures, requiring massive size and operational costs to achieve their mission. These systems typically rely on propagation off the ionosphere and consequently broadcast signals over extremely large areas, making transmit signals relatively easy to intercept.

The disclosed invention utilizes arrays of compact VLF transmitters configured to enhance radiation in the direction of the ocean surface and to suppress radiation outside of a desired coverage area to suppress signal reception and interception. This approach allows VLF coverage to be localized to a desired portion of the ocean and reduces the needed transmitter power and cost associated with operating a VLF transmitter. The arrays of VLF transmitter nodes 10 may be on semi-autonomous platforms and phased to create an array which localizes VLF coverage to some portion of the ocean surface. The semi-autonomous platforms may be maritime, airborne, or space platforms spaced at regular intervals from their nearest neighbors.

In this disclosure, the ocean is an example of a body of water. Rather than being an ocean, the body of water may be any body of water, such as a lake.

In radio frequency (RF) engineering, it is common to use linear and collinear antenna arrays; however, at VLF frequencies conventional feeding networks used to supply and drive these arrays are impractical due to the spacing between VLF transmitter nodes in the array and the very long wavelength. The present invention describes a system and method of phasing and coordinating the arrays of maritime, airborne or space-borne VLF transmitter nodes.

Figure 1:
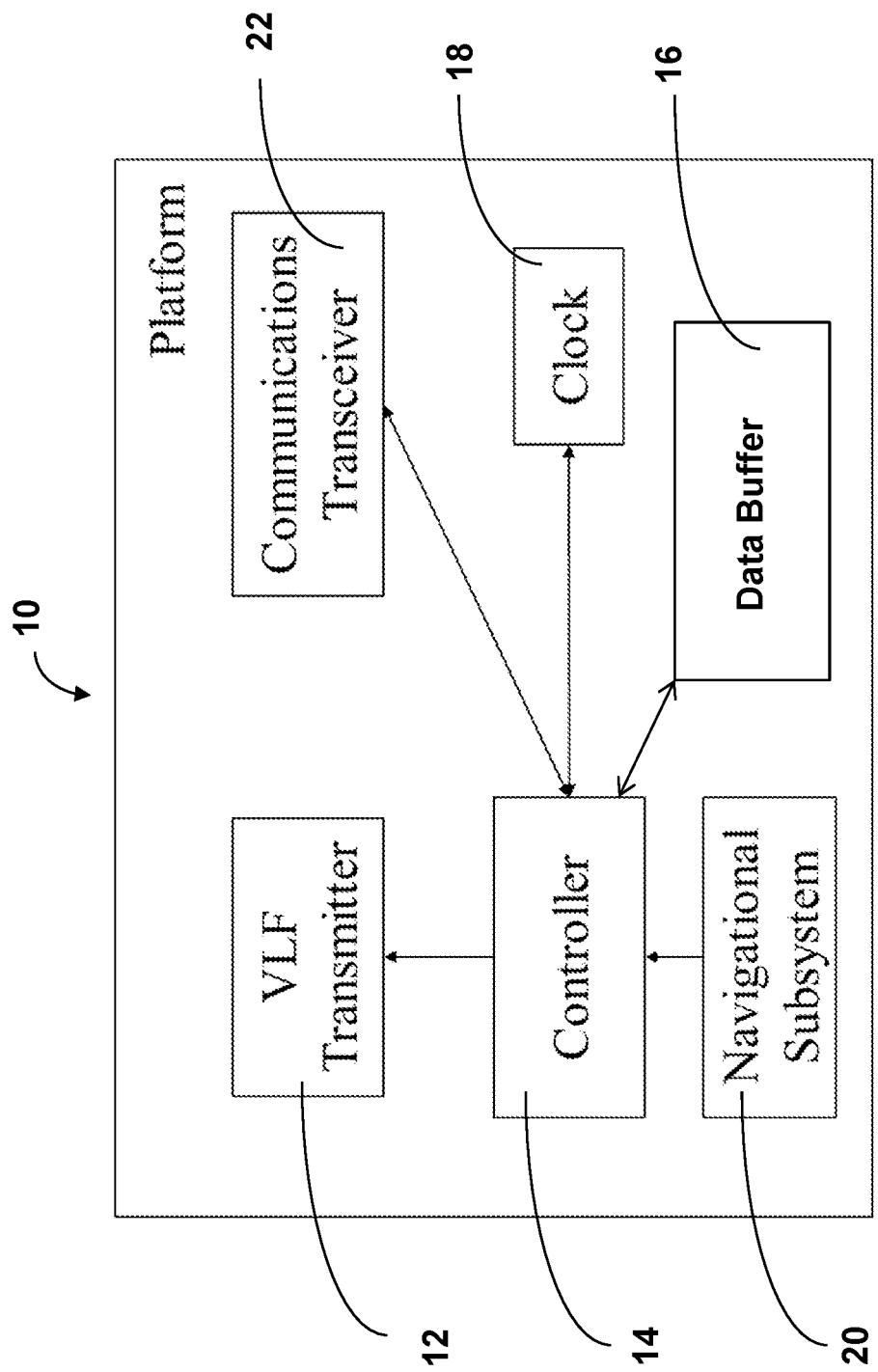
FIG. 1 shows a block diagram showing major subsystems within a VLF transmitter node in accordance with the present disclosure.

Now referring to FIG. 1, a block diagram of one VLF transmitter node 10 is shown. As shown in FIG. 1, the VLF transmitter node 10 may include a VLF transmitter 12, a controller 14, a data buffer 16, a clock 18, a navigation subsystem 20 and a communications transceiver 22. The controller may include a processor, such as a microprocessor or a computer. The navigation subsystem may be a global positioning system (GPS), and include an inertial sensor, such as a gyroscope and so on. The communications transceiver 22 is configured to operate in a band different than VLF, and may be a high frequency (HF), very high frequency (VHF), ultra high frequency (UHF), or satellite transceiver or radio.

Figure 2:
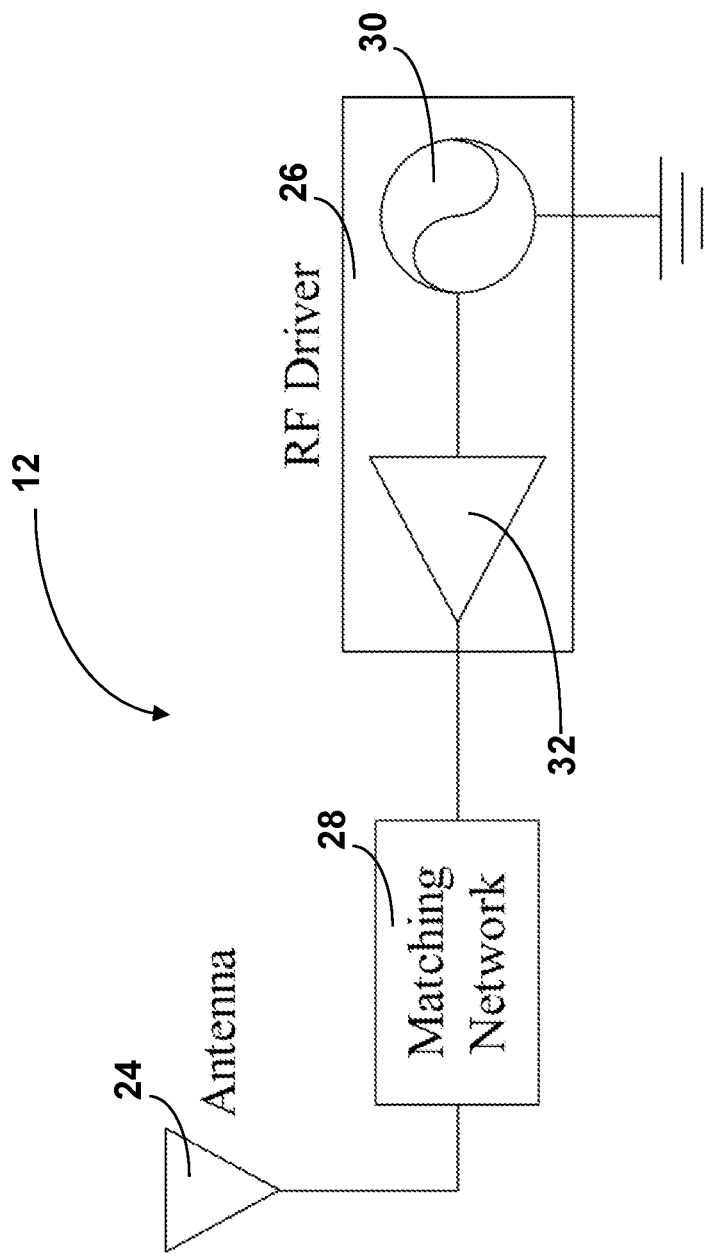
FIG. 2 shows a high level schematic of a VLF transmitter showing an antenna, a matching network, and an RF driver in accordance with the present disclosure.

The VLF transmitter 12, as shown in FIG. 2, may include an antenna 24, an RF driver 26, and a matching network 28. The antenna 24 may be an electrically small monopole, a dipole or a loop antenna. The matching network 28 may include inductors, capacitors, resistors, switches, and/or any combination of such components appropriate to resonate the antenna and improve transmitter efficiency over the desired VLF bandwidth. The RF driver for the transmitter may include an RF signal generator 30 electrically connected to an amplifier 32.

The electromagnetic fields generated by the array of VLF transmitter nodes 10 may be controlled by varying the relative phase transmitted by each VLF transmitter node 10 in the array. Coordination and phasing of each VLF transmitter node 10 in the array with its neighbors may be achieved through a variety of techniques. The data to be transmitted may be received via communications transceiver 22 and stored in the data buffer 16 of each VLF transmitter node 10 for transmission at a time which may be different for each respective VLF transmitter node 10 in order to properly phase the combined transmission of the array of VLF transmitter nodes 10.

In one embodiment in order to properly phase the transmission from each VLF transmitter node 10 in an array, a respective VLF transmitter node 10 begins transmitting the data from its data buffer 16 at a time and in a radiation mode predetermined by commands received by the respective VLF transmitter node 10 via the communications transceiver 22. In another embodiment, each respective VLF transmitter node 10 autonomously determines the time and radiation mode to begin transmission of the data in the data buffer 16. The time of transmission and radiation mode of a respective VLF transmitter node 10 is relative to other nodes 10 in the array and is relative to the position of the respective VLF transmitter node 10 in the array of nodes and the radiation mode.

A VLF transmitter node 10 in the array may operate autonomously to sense its position relative to other VLF transmitter nodes 10 in the array and to control its position in the array using on-board autonomy algorithms processed in the controller and some form of propulsion on the platform hosting the VLF transmitter node 10. In this embodiment, the mission and position for each VLF transmitter node 10 in the array may be preprogrammed. Position data may be determined by the navigation system 20 through an external source such as GPS, and by using an onboard inertial sensor, such as a gyroscope. Attitude and orientation of each platform that has an VLF transmitter node 10 may be maintained by measuring relative changes via the onboard inertial sensor and making corrections using engines and/or propulsion systems on the platform hosting the VLF transmitter node 10. The relative phasing for each respective transmitter is determined based on the estimated position and orientation of the transmitter relative to other transmitters in the array of nodes.

In another embodiment, one VLF transmitter node 10 in the array is designated as a master node and determines the positions and operations of the other VLF transmitter nodes 10 in the array through on-board autonomy algorithms or through instructions received by the master node via a long-haul communication channel, which may use the communications transceiver 22. In this embodiment, communication between the master node and the other VLF transmitter nodes 10 in the array may be achieved using a local communication network using the communications transceiver 22. The communications transceiver 22 in each VLF transmitter node 10 may include the local communication network, and at least the master node needs to include the long-haul communications channel. Each VLF transmitter node 10 may include both the local and long-haul communications channels to provide redundancy, as well as making the manufacture of each VLF transmitter node 10 the same. The communications transceiver 22 in each VLF transmitter node 10 may be a high frequency (HF), very high frequency (VHF), ultra high frequency (UHF), or satellite transceiver or radio. The master node coordinates the position and phasing of each VLF transmitter node 10 in the array, and the phasing or transmission time for each VLF transmitter node 10 may be determined by timing signals received through an external source such as a GPS reference via the navigation system 20, or through local signals emitted from the master node to the other VLF transmitter nodes 10 in the array.

In another embodiment, each node in the array is coordinated individually through commands received from a remote operator via the long-haul communication channel. In this embodiment, position, orientation, phasing, and timing are all received by each VLF transmitter node 10 through the long-haul communication channel via the communications transceiver 22 in each node, which again may be high frequency (HF), very high frequency (VHF), ultra high frequency (UHF), or satellite transceiver or radio.

Figure 3:
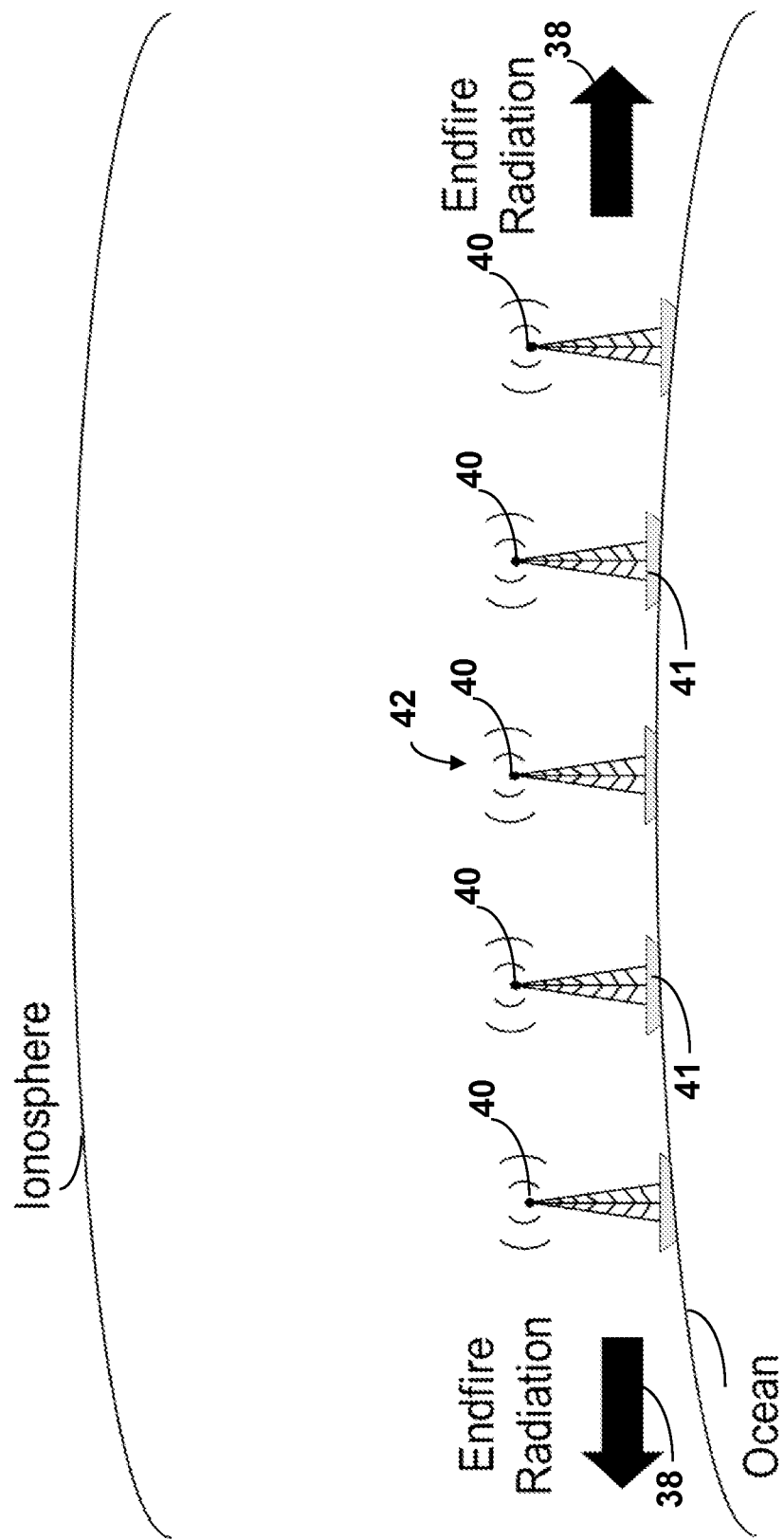
FIG. 3 shows an array of VLF transmitters spaced less than one half wavelength from their nearest neighbors and phased to radiate maximally in a direction substantially parallel to the ocean surface and to radiate minimally in a direction to the ionosphere in accordance with the present disclosure.

As shown in the embodiment of FIG. 3, an array of electrically small VLF transmitter nodes 40 may be supported on semi-autonomous maritime platforms 41 distributed on the ocean surface, preferably in a regular grid, and positioned less than one half wavelength from one another. The regular grid may be a linear 1 dimensional array, or a 2 dimensional array. Each maritime platform 41 may be any variety of buoyant vessel, such as a boat, barge, or buoy. In this embodiment, antennas 24 for each VLF transmitter nodes 40 are polarized parallel to the ocean surface for magnetic antennas, such as loops, or normal to the ocean surface for electric antennas, such as monopoles and dipoles.

Preferably the VLF transmitter nodes 40 in the array shown in FIG. 3 are spaced roughly a quarter wavelength from their nearest neighbor and phased to enhance radiation in a direction parallel to the ocean surface, while suppressing radiation in other directions. In FIG. 3 an example linear one dimensional array is shown and the radiation is shown as endfire radiation 38. In one example, each respective VLF transmitter node 40 autonomously knows via navigation sensor 20 and information received via communications transceiver 22 its distance (rho) from a desired center of the array. In FIG. 3, the master node 42 is shown at the center of the array; however, the master node 42 does not need to be at the desired center of the array. In another embodiment, each respective VLF transmitter node 40 is informed via the communications transceiver 22, as described above, of its desired position in the array and therefore the distance (rho) from a desired center of the array.

If the master node 42 is at the desired center of the array, then given a time, t0,when the master node 42 begins transmission, each respective VLF transmitter node 40 begins transmission with an added delay, so that a respective VLF transmitter node 40 at a distance rho from the master node 42 at the center of the array begins transmission at time (t0+vg*rho), where vg is a group velocity of a Norton wave, rho is a distance from a desired center of the array, and t0 is a time the master node 42 at the center of the array begins transmission. The symbol * indicates a multiplication.

The equation above for transmission time from each VLF transmitter node is correct, even if master node 42 is not at the center of the array and even if there is no master node, as long as "t0" is the time at which an actual node or a virtual node at the center of the array begins transmission.

In the embodiment shown in FIG. 3, the resulting radiation pattern may be a doughnut shaped radiation pattern strongly directed toward the horizon, or parallel to the ocean surface. This radiation pattern is intended to enhance coupling into the Norton surface wave. This may also suppress coupling into the skywave via the ionosphere, thereby better localizing VLF signal coverage and more efficiently directing radiated power along the ocean surface; however, this effect has not been fully investigated to date.

Figure 4:
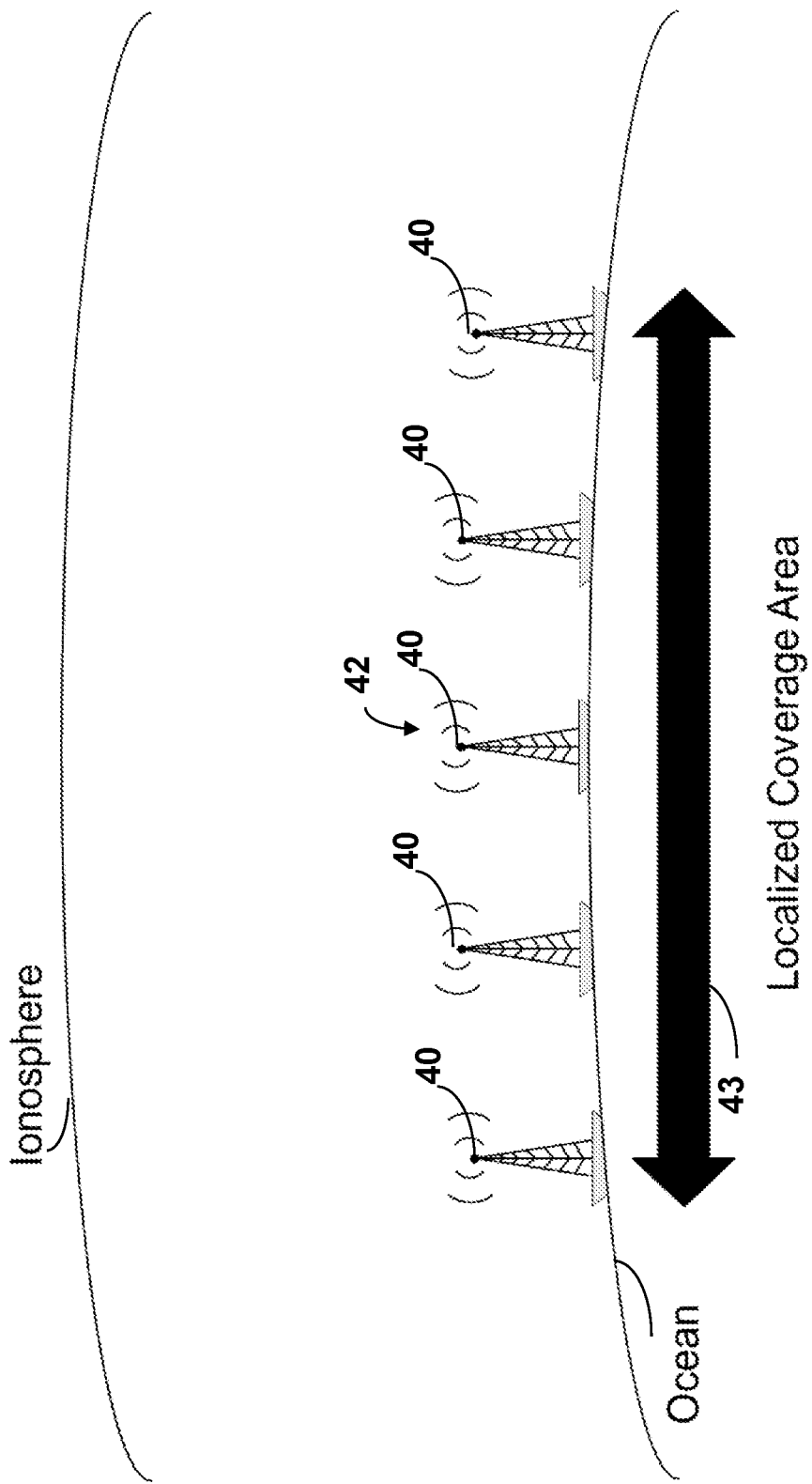
FIG. 4 shows an array of VLF transmitters that generates a slow wave along the surface and is phased to suppress radiation in any other direction in accordance with the present disclosure.

In a related embodiment, the phase delay for each VLF transmitter node 40 may be greater than vg*rho, thereby generating a slow wave. In this embodiment, transmission for a respective VLF transmitter node 40 at distance rho begins at time (t0+n*vg*rho), where n is a factor greater than 1 corresponding to a synthesized index of refraction for the wave, vg is a group velocity of a Norton wave, rho is a distance from a desired center of the array, and t0 is a time an actual node, which can be, for example, the master node 42 or a virtual node at the center of the array begins transmission. This configuration generates a traveling wave electromagnetic field 43 within the confines of the array, as shown in FIG. 4, but does not radiate efficiently away from the array. This configuration also suppresses radiation upward to the ionosphere.

Figure 5:
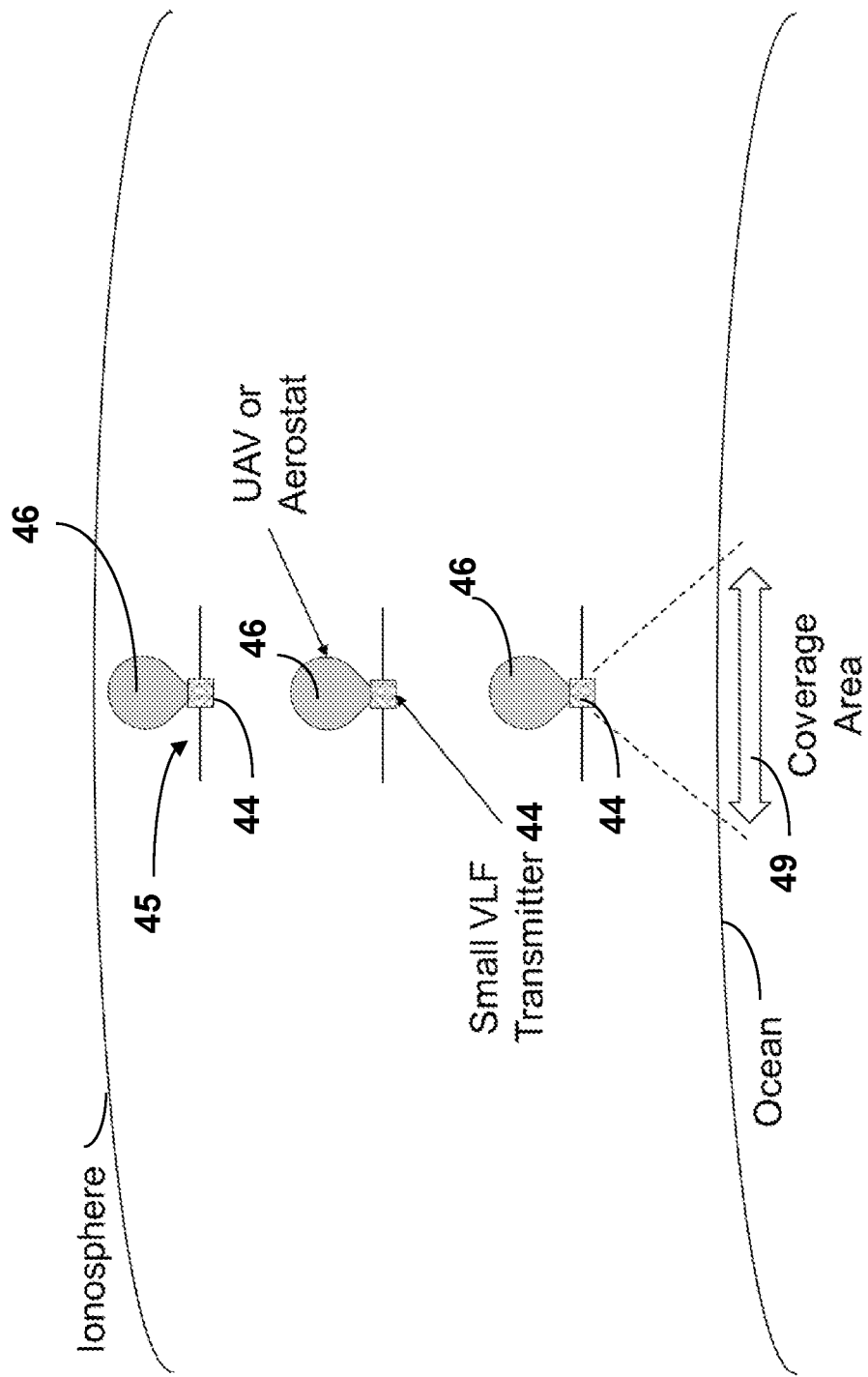
FIG. 5 shows an array of VLF transmitters, each supported by an aerial vehicle, arranged in a line normal to the ocean surface and coordinated to create a radiation maximum in the direction of the ocean surface in accordance with the present disclosure.

In another embodiment, this invention includes an array of electrically small VLF transmitter nodes 44 arranged in a line or plane normal to the surface of the ocean and supported by airborne vehicles 46, as shown in FIG. 5. The airborne vehicles may be any variety of fixed wing, rotorcraft, lighter than air vehicles, drones, or unmanned airborne vehicles (UAVs). In this embodiment, antennas 24 for each node 44 can be oriented parallel or normal to the surface of the ocean. VLF transmitter nodes 44 in the array are preferably spaced roughly a quarter wavelength from their nearest neighbor and are phased to enhance radiation in the direction of the ocean surface, while suppressing radiation in other directions. The phase of each VLF transmitter node 44 may be chosen to be delayed in proportion to the propagation phase from the next highest in elevation VLF transmitter node 44. This is preferably implemented as a time delay, where each respective VLF transmitter node 44 begins transmission at time (t0+vg*(hmax-h)), where h is the height of a respective VLF transmitter node 44, hmax is the height of the top or highest 45 VLF transmitter node 44 in the array, vg is a group velocity of an electromagnetic wave in air, and t0 is a time the top or highest 45 VLF transmitter node 44 in the array begins transmission.

Figure 6:
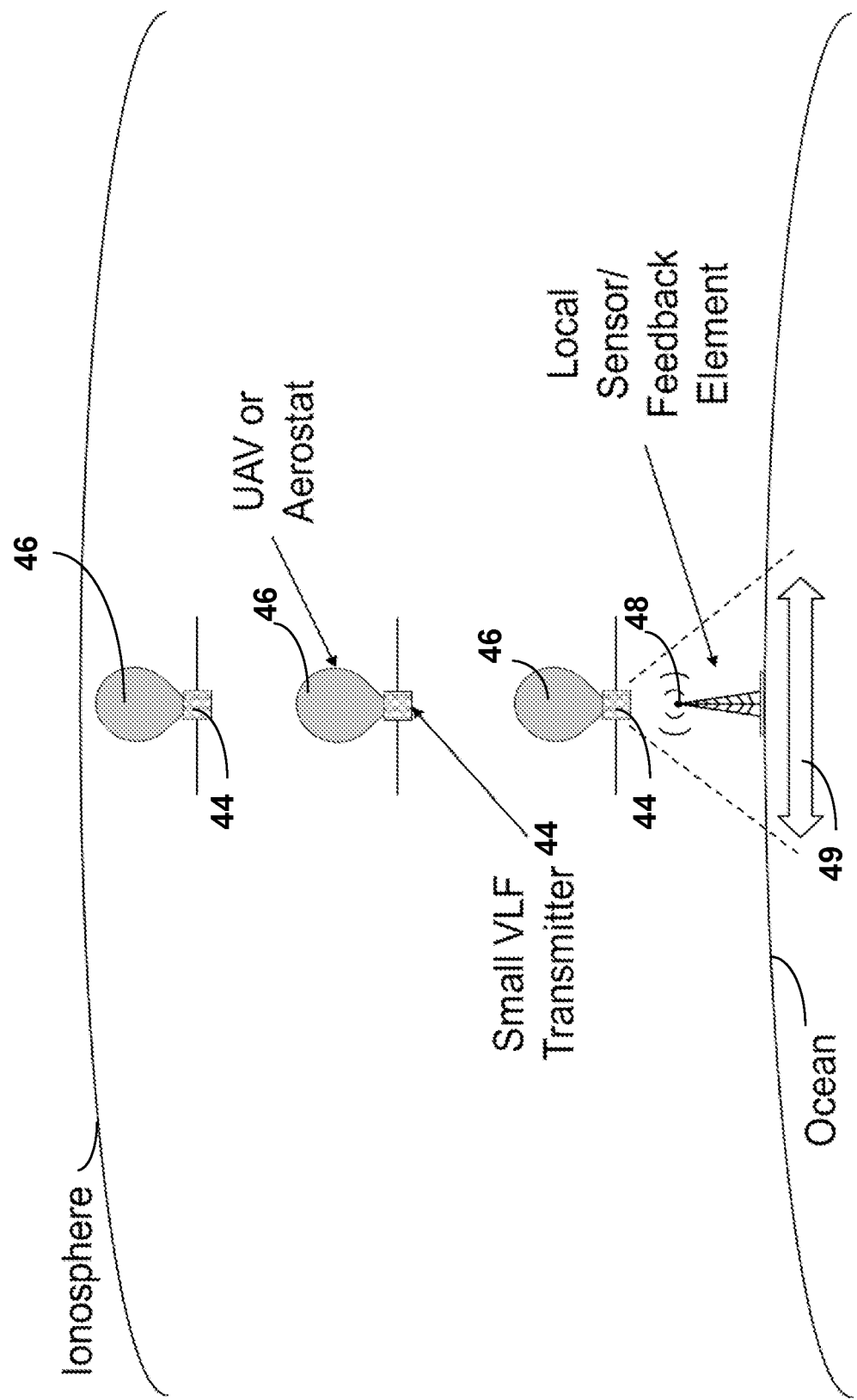
FIG. 6 shows a variation on the embodiment in FIG. 5 in which a local VLF sensor is placed on the surface of the ocean near a desired center of the coverage area to measure an amplitude of the VLF field generated by the array of VLF transmitters to provide feedback to improve the coordination and phasing of the array of VLF transmitters in accordance with the present disclosure.

In a variation on this embodiment a VLF sensor 48 is placed on the surface of the ocean within or near, and preferably at the center of, the coverage area 49, as shown in FIG. 6. The sensor 48 measures a set of at least one characteristic, for example strength, of the VLF signal generated by the array of VLF transmitter nodes 44 at a point within or near, and preferably at the center of, the coverage area 49. Then the sensor 48 transmits, via a radio frequency signal at a noninterfering and different frequency, the relevant characteristics of the measured VLF signal. This transmission is then received by each VLF transmitter node 44 by its communication transceiver 22 and used as input to on-board adaptive beamforming algorithms operating in the controller 14 to correct the phasing or timing of a transmission of each VLF transmitter node 44 in the array and may also be used to adjust the position of the VLF transmitter node 44 in the array.

Figure 7:
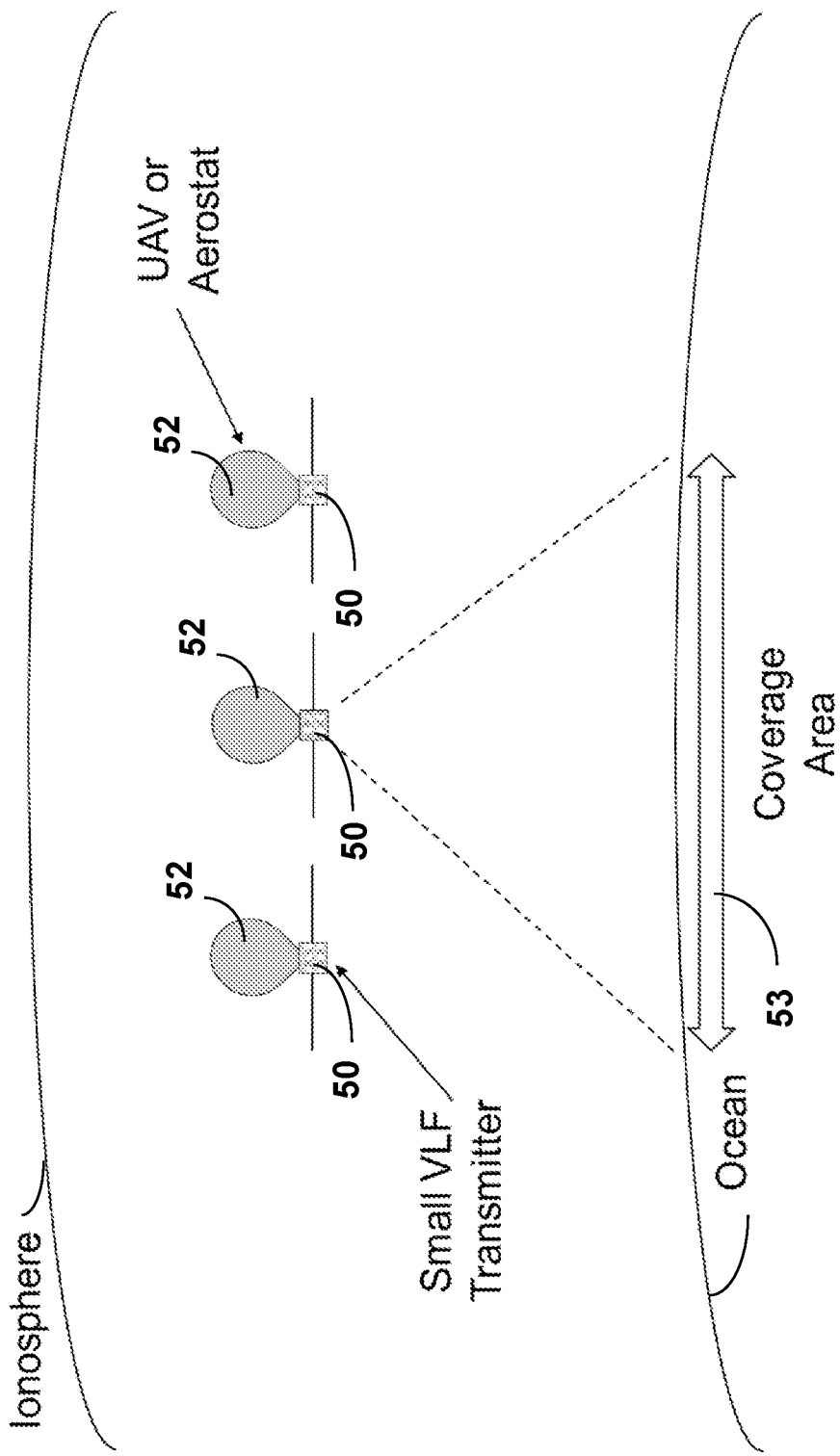
FIG. 7 shows an array of VLF transmitters arranged in a plane substantially parallel to the ocean surface and supported by an aerial vehicles and phased to radiate maximally in a direction substantially normal to the ocean surface and to radiate minimally in a direction parallel to the ocean surface in accordance with the present disclosure.

In another embodiment, this invention includes an array of electrically small VLF transmitters 50 arranged in a line or in a plane substantially parallel to the surface of the ocean and supported by airborne vehicles 52, as shown in FIG. 7. By substantially parallel it is meant that the VLF transmitters 50 are preferably within ⅛ of the transmission wavelength from a plane substantially parallel to the surface of the ocean, where they are in an actual plane or line that is parallel to the tangent line of the ocean surface, or where the VLF transmitters 50 are all at the same elevation above the earth's surface. These two cases are the same for small array sizes but slightly diverge for large array sizes.

The airborne vehicles 52 may be any variety of fixed wing, rotorcraft, lighter than air vehicles, drones or UAVs. In this embodiment, antennas for each node may be oriented parallel or normal to the surface of the ocean. Nodes in the array are spaced roughly one half wavelength (and less than one wavelength) from their nearest neighbor and are phased to enhance radiation in the direction of the ocean surface to the coverage area 53. This embodiment also radiates in an upward direction. In this embodiment, all nodes begin transmission at substantially the same time with substantially the same phase.

Figure 8:
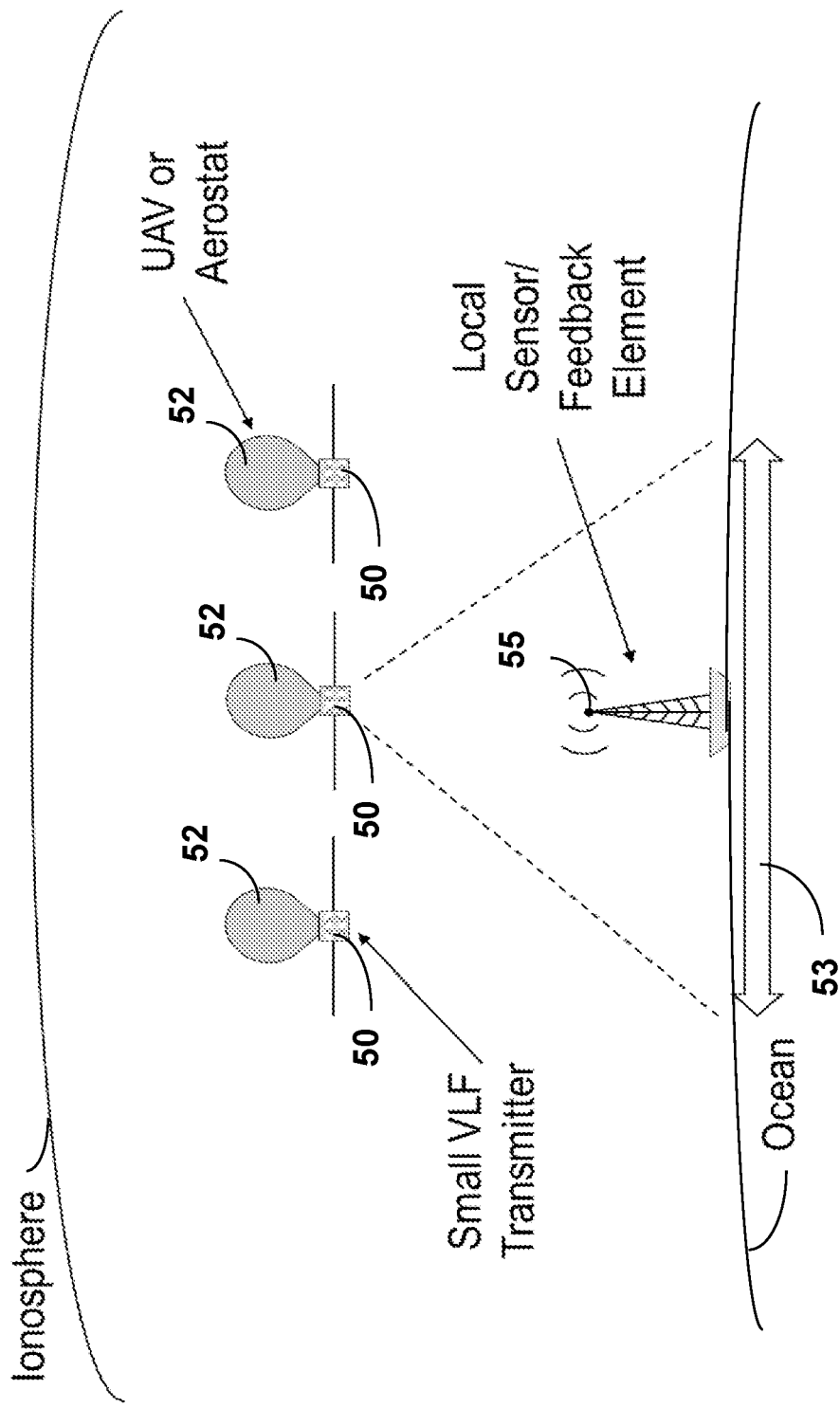
FIG. 8 shows a variation on the embodiment in FIG. 7 in which a local VLF sensor is placed on the surface of the ocean near a desired center of the coverage area to measure an amplitude of the VLF field generated by the array of VLF transmitters to provide feedback to improve the coordination and phasing of the array of VLF transmitters in accordance with the present disclosure.

In a variation on this embodiment a VLF sensor 55 is placed on the surface of the ocean within or near, and preferably at the center of, the coverage area 53, as shown in FIG. 8. The sensor 55 measures a set of at least one characteristic (e.g. strength) of the VLF signal generated by the array of VLF transmitter nodes 50 at a point within or near, and preferably at the center of, the coverage area 53. Then the sensor 55 transmits, via a radio frequency signal at a noninterfering and different frequency, the relevant characteristics of the measured VLF signal. This signal is then received by each VLF transmitter node 50 by its communication transceiver 22 and used as input to on-board adaptive beamforming algorithms operating in the controller 14 to correct the phasing or timing of a transmission of each VLF transmitter node 50 in the array and may also be used to adjust the position of the VLF transmitter node 50 in the array.

In a related embodiment, the VLF transmitter nodes 50 are arranged in two planes both parallel to the surface of the ocean with the two planes vertically separated from one another by less than one half wavelength of the transmission frequency, and preferably separated by approximately one quarter wavelength of the VLF transmission. The VLF transmitter nodes 50 in each plane may be spaced less than 1 wavelength apart. The VLF transmitter nodes 50 are preferably phased to radiate straight downward toward the ocean surface, but not upward away from the ocean surface. In one embodiment, all the VLF transmitter nodes 50 in a plane begin transmission at the same time; however, transmission from the VLF transmitter nodes 50 in the lower plane is delayed by an amount such that radiation from the lower plane adds in phase to the radiation from the VLF transmitter nodes 50 in the upper plane and in the direction of the ocean. In another embodiment, the transmission from the VLF transmitter nodes 50 in the lower plane is delayed by an amount that cancels radiation in an upward direction toward the ionosphere. When the separation between the two planes is a quarter wavelength of the VLF transmission frequency, these two embodiments are the same, and the time delay between the top and bottom plane is given by (vg*(htop-hbottom)), where vg is a group velocity of an electromagnetic wave in air, htop is a height of the upper plane from the ocean surface, and hbottom is a height of the lower plane from the ocean surface.

Figure 9:
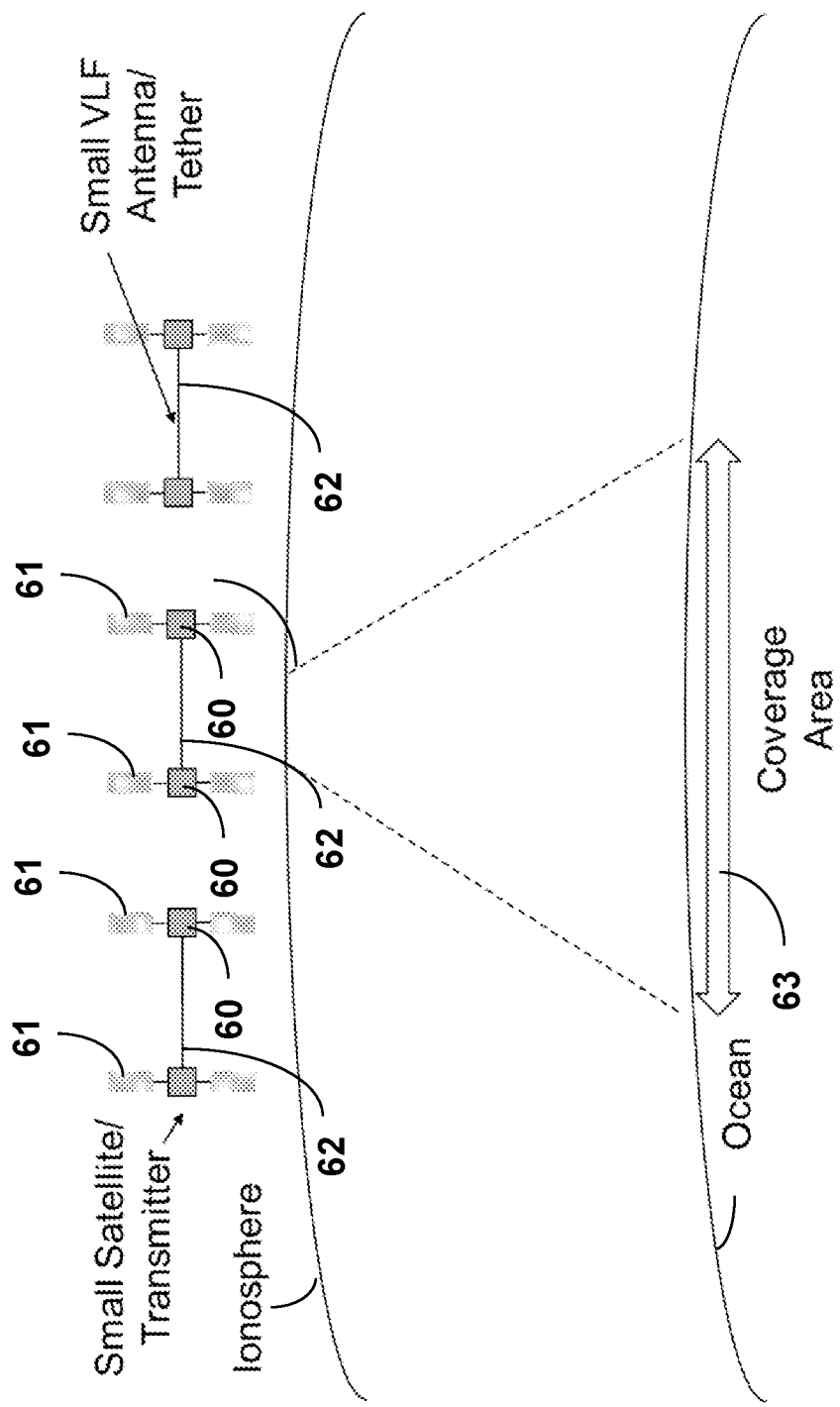
FIG. 9 shows an array of VLF transmitters arranged in a plane substantially parallel to the ocean surface and supported by satellites and phased to radiate maximally in a direction substantially normal to the ocean surface and to radiate minimally in a direction parallel to the ocean surface in accordance with the present disclosure.

In another embodiment, this invention includes an array of electrically small VLF transmitter nodes 60 arranged in a line or plane parallel to the surface of the ocean and supported by satellites 61, as shown in FIG. 9. In a preferred embodiment, the satellites 61 are arranged in pairs of small satellites 61 connected by a tether 62, with a dipole antenna placed along the length of the tether. In a preferred embodiment, the tether is conductive and is used as the conductor of the dipole antenna. A variety of satellite and antenna configurations may be used. In this embodiment, antennas 24 for each node in the array are oriented parallel to the surface of the ocean. VLF transmitter nodes 60 in the array are spaced roughly one half wavelength from their nearest neighbor and are phased to enhance radiation in the direction of the ocean surface and the coverage area 63, while suppressing radiation in other directions. This is accomplished by transmitting from all nodes at the same time with the same phase.

Figure 10:
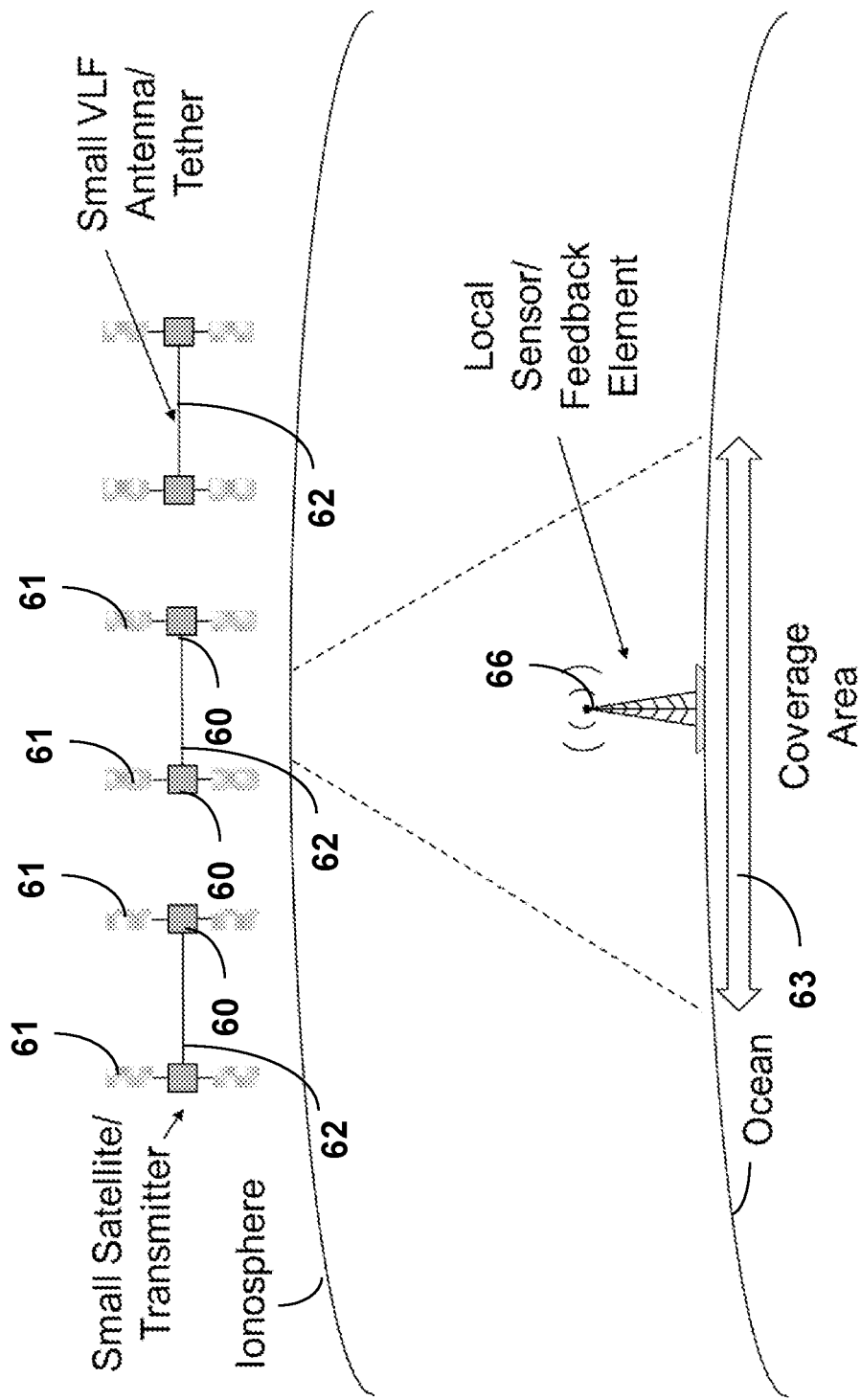
FIG. 10 shows a variation on the embodiment in FIG. 9 in which a local VLF sensor is place on the surface of the ocean near a desired center of the coverage area to measure an amplitude of the VLF field generated by the array of VLF transmitters to provide feedback to improve the coordination and phasing of the array of VLF transmitters in accordance with the present disclosure.

In a variation on this embodiment a VLF sensor 66 is placed on the surface of the ocean within and preferably near a center of a desired coverage area 63, as shown in FIG. 10. The sensor 66 measures a characteristic, e.g. the strength, of the VLF signal generated by the array of VLF transmitter nodes 60. Then the sensor 66 broadcasts, via a radio frequency signal at a noninterfering and different frequency, the characteristic of the measured VLF signal, as described above with reference to FIG. 8. This broadcasted signal is then received by each VLF transmitter node 60 by its communication transceiver 22 and used as input to on-board adaptive beamforming algorithms operating in the controller 14 to correct the phasing or timing of a transmission of each VLF transmitter node 60 in the array and may also be used to adjust the position of the VLF transmitter node 60 in the array, which may require repositioning one or more satellite pairs 61.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim node in the singular is not intended to mean "one and only one" unless explicitly so stated. Moreover, no node, component, nor method or process step in this disclosure is intended to be dedicated to the public regardless of whether the node, component, or step is explicitly recited in the Claims. No claim node herein is to be construed under the provisions of 35 U.S.C. Sec. 112, sixth paragraph, unless the node is expressly recited using the phrase "means for . . ." and no method or process step herein is to be construed under those provisions unless the step, or steps, are expressly recited using the phrase "comprising the step(s) of . . ."

What is claimed is:

1. A system for subsurface transmission comprising:
   a first array of very low frequency (VLF) transmitter nodes each hosted on an airborne platform, each VLF transmitter node comprising:
   a controller;
   a VLF transmitter coupled to the controller;
   a data buffer coupled to the controller;
   a navigation subsystem coupled to the controller; and
   a communications transceiver coupled to the controller;
   wherein each VLF transmitter node is positioned less than one wavelength of a desired very low frequency from another VLF transmitter node;
   wherein data to be transmitted is received by the communications transceiver in each VLF transmitter node and stored in the data buffer in each VLF transmitter node; and
   wherein each respective VLF transmitter node transmits the data in the data buffer of the respective VLF transmitter node with phasing or timing.

2. The system of claim 1:
   wherein each VLF transmitter node is positioned roughly a quarter wavelength of the desired very low frequency from another VLF transmitter node; and wherein transmission for a respective VLF transmitter node begins at time (t0+vg*(hmax-h)), where h is a height of a respective VLF transmitter node, hmax is a height of a highest VLF transmitter node in the array, vg is a group velocity of a Norton wave, and t0 is a time the highest VLF transmitter node begins transmission.

3. The system of claim 1:

wherein each VLF transmitter node is positioned roughly a quarter wavelength of the desired very low frequency from another VLF transmitter node; and wherein transmission of the data in the data buffer for each respective VLF transmitter node begins at the same time.

4. The system of claim 1:

wherein the airborne platforms comprise fixed wing aircraft, rotorcraft, lighter than air vehicles, drones or unmanned airborne vehicles (UAVs).

5. The system of claim 1 further comprising:

a very low frequency (VLF) sensor on the surface of the body of water;

wherein the VLF sensor measures a characteristic of a received VLF signal generated by the array of VLF transmitter nodes;

wherein the sensor transmits the characteristic of the received VLF signal; and wherein the transmitted characteristic of the received VLF signal is received by the communications transceiver and used by the controller in each VLF transmitter node to adjust a transmission phasing or timing of each VLF transmitter node in the array to optimize the characteristic of the received VLF signal.

6. The system of claim 5 wherein each VLF transmitter node further comprises:

a propulsion system on the airborne platform coupled to the controller;

wherein the transmitted characteristic of the received VLF signal is received by the communications transceiver and used by the controller in each VLF transmitter node to adjust a position of the VLF transmitter node in the array.

7. The system of claim 1 further comprising:

a second array of very low frequency (VLF) transmitter nodes each hosted on an airborne platform and arranged in a plane parallel to the surface of a body of water, each VLF transmitter node in the second array comprising:

a controller;

a VLF transmitter coupled to the controller;

a data buffer coupled to the controller;

a navigation subsystem coupled to the controller; and a communications transceiver coupled to the controller;

wherein each VLF transmitter node in the second array is positioned less than one wavelength of the desired very low frequency from another VLF transmitter node in the second array;

wherein the second array of VLF transmitter nodes is parallel to the first array of VLF transmitter nodes; and wherein the first array and the second array are vertically separated from one another by less than one half wavelength of the desired very low frequency.

8. The system of claim 7:

wherein the transmission of data from each respective VLF transmitter node in the first and the second array is phased or timed.

9. The system of claim 7:

wherein the transmission of data from each respective VLF transmitter node in the first array begins at the same first time;

wherein the transmission of data from each respective VLF transmitter node in the second array begins at the same second time; and wherein transmission from a lower plane of the first array is delayed by an amount.

10. The system of claim 7:

wherein the vertical separation between the first array and the second array is one quarter wavelength of the desired very low frequency; and wherein transmission from a lower plane of the first array and the second array is delayed by an amount.

11. The system of claim 7:

wherein transmission from a lower plane of the first array and the second array is delayed.

12. The system of claim 1:

wherein each VLF transmitter node is arranged in a plane that is substantially parallel to a surface of a body of water.

13. The system of claim 1:

wherein each VLF transmitter node is arranged in a line or plane normal to a surface of a body of water.

14. The system of claim 1:

wherein each VLF transmitter node is positioned less than one half wavelength of the desired very low frequency from another VLF transmitter node.

* * * * *